(12) United States Patent
Tripathi et al.

(10) Patent No.: US 9,020,735 B2
(45) Date of Patent: *Apr. 28, 2015

(54) SKIP FIRE INTERNAL COMBUSTION ENGINE CONTROL

(75) Inventors: Adya S. Tripathi, San Jose, CA (US); Farzad Sahandiesfanjani, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 817 days.

This patent is subject to a terminal disclaimer.

(21) Appl. No.: 13/309,447

(22) Filed: Dec. 1, 2011

(65) Prior Publication Data

US 2012/0109495 A1 May 3, 2012

Related U.S. Application Data

(63) Continuation-in-part of application No. 13/101,042, filed on May 4, 2011, now Pat. No. 8,099,224, and a (Continued)

(51) Int. Cl.
*F02D 28/00* (2006.01)
*F02D 41/28* (2006.01)

(Continued)

(52) U.S. Cl.
CPC ............... *F02D 41/28* (2013.01); *F02D 41/00* (2013.01); *F02D 41/30* (2013.01); *F02D 41/008* (2013.01);

(Continued)

(58) Field of Classification Search
CPC ......... F02D 41/00; F02D 41/30; F02D 41/28; F02D 17/02; F02D 41/008; F02D 41/0087; G06F 19/00; G06F 17/00

USPC ....... 123/350, 478, 480, 481, 198 F; 701/115, 701/102–105

See application file for complete search history.

(56) References Cited

U.S. PATENT DOCUMENTS 2,771,867 A 11/1956 Péras
2,875,742 A 3/1959 Dolza (Continued)

FOREIGN PATENT DOCUMENTS

CN 1875179 12/2006
JP 2001-159236 6/2001

(Continued)

OTHER PUBLICATIONS

International Search Report dated Apr. 17, 2012 from International Application No. PCT/US11/62895.

(Continued)

*Primary Examiner* — Hieu T Vo
(74) *Attorney, Agent, or Firm* — Beyer Law Group LLP

(57) ABSTRACT

A variety of methods and arrangements for controlling the operation of an internal combustion engine in a skip fire variable displacement mode are described. In one aspect, the working chamber firing that are selected to deliver the desired engine output are determined at least in part based on torque feedback. The torque feedback may be an indication of the torque output of the engine or the torque experienced at some other location in the drive train. In some embodiments, the torque feedback signal is filtered to remove high frequency components of the torque feedback signal in order to help stabilize the system. In another aspect, other operational parameters are used as feedback in the determination of the firing sequence. In yet another aspect, a filter is arranged to filter a feedback signal to provide a filtered feedback signal that is used in the determination of the working chamber firings.

35 Claims, 6 Drawing Sheets

Related U.S. Application Data continuation-in-part of application No. 13/004,839, filed on Jan. 11, 2011, now Pat. No. 8,616,181, and a continuation-in-part of application No. 13/004,844, filed on Jan. 11, 2011, now Pat. No. 8,701,628, said application No. 13/101,042 is a continuation-in-part of application No. 12/501,345, filed on Jul. 10, 2009, now Pat. No. 8,336,521, said application No. 13/004,839 is a continuation-in-part of application No. 12/501,345, filed on Jul. 10, 2009, now Pat. No. 8,336,521, said application No. 13/004,844 is a continuation-in-part of application No. 12/501,345, filed on Jul. 10, 2009, now Pat. No. 8,336,521, which is a continuation-in-part of application No. 12/355,725, filed on Jan. 16, 2009, now Pat. No. 8,131,447.

(60) Provisional application No. 61/080,192, filed on Jul. 11, 2008, provisional application No. 61/104,222, filed on Oct. 9, 2008, provisional application No. 61/294,077, filed on Jan. 11, 2010, provisional application No. 61/418,779, filed on Dec. 1, 2010.

(51) Int. Cl.

| | | |
|---|---|---|
| *F02D 41/00* | (2006.01) | |
| *F02D 41/30* | (2006.01) | |
| *F02D 41/14* | (2006.01) | |
| *F02D 41/26* | (2006.01) | |
| *F02P 5/00* | (2006.01) | |
| *F02P 5/15* | (2006.01) | |
| *G06F 19/00* | (2011.01) | |
| *G06F 17/00* | (2006.01) | |
| *F02D 37/02* | (2006.01) | |

(52) U.S. Cl.
CPC .............. *G06F 19/00* (2013.01); *G06F 17/00* (2013.01); *F02D 37/02* (2013.01); *F02D 41/0087* (2013.01); *F02D 41/1401* (2013.01); *F02D 41/1408* (2013.01); *F02D 41/266* (2013.01); *F02D 2041/1432* (2013.01); *F02D 2200/602* (2013.01); *F02D 2250/18* (2013.01); *F02D 2400/02* (2013.01); *F02P 5/00* (2013.01); *F02P 5/1512* (2013.01); *Y02T 10/46* (2013.01)

(56) References Cited

U.S. PATENT DOCUMENTS

| | | |
|---|---|---|
| 3,756,205 A | 9/1973 | Frost |
| 3,996,915 A | 12/1976 | Demetrescu |
| 4,040,395 A | 8/1977 | Demetrescu |
| 4,064,844 A | 12/1977 | Matsumoto et al. |
| 4,100,891 A | 7/1978 | Williams |
| 4,129,109 A | 12/1978 | Matsumoto |
| 4,161,166 A | 7/1979 | Roznovsky |
| 4,172,434 A | 10/1979 | Coles |
| 4,274,382 A | 6/1981 | Sugasawa et al. |
| 4,276,863 A | 7/1981 | Sugasawa et al. |
| 4,306,529 A | 12/1981 | Chiesa et al. |
| 4,337,740 A | 7/1982 | Sugasawa et al. |
| 4,388,906 A | 6/1983 | Sugiyama et al. |
| 4,434,767 A | 3/1984 | Kohama et al. |
| 4,489,695 A | 12/1984 | Kohama et al. |
| 4,509,488 A | 4/1985 | Forster et al. |
| 4,528,960 A | 7/1985 | Mizuno et al. |
| 4,530,332 A | 7/1985 | Harvey et al. |
| 4,541,387 A | 9/1985 | Morikawa |
| 4,590,907 A | 5/1986 | Tsukamoto et al. |
| 4,841,933 A | 6/1989 | McHale et al. |
| 4,854,283 A | 8/1989 | Kiyono et al. |
| 5,058,550 A | 10/1991 | Nagano et al. |
| 5,079,691 A | 1/1992 | Heck et al. |
| 5,117,790 A | 6/1992 | Clarke et al. |
| 5,275,143 A | 1/1994 | Lembke et al. |
| 5,374,224 A | 12/1994 | Huffmaster et al. |
| 5,377,631 A | 1/1995 | Schechter |
| 5,404,857 A | 4/1995 | Schommers |
| 5,408,966 A | 4/1995 | Lipinski et al. |
| 5,408,974 A | 4/1995 | Lipinski et al. |
| 5,431,139 A | 7/1995 | Grutter et al. |
| 5,437,253 A | 8/1995 | Huffmaster et al. |
| 5,464,000 A | 11/1995 | Pursifull et al. |
| 5,471,963 A | 12/1995 | Nishioka et al. |
| 5,483,941 A | 1/1996 | Cullen et al. |
| 5,540,633 A | 7/1996 | Yamanaka et al. |
| 5,553,575 A | 9/1996 | Beck et al. |
| 5,555,871 A | 9/1996 | Gopp et al. |
| 5,581,022 A | 12/1996 | Sprague et al. |
| 5,584,266 A | 12/1996 | Motose et al. |
| 5,584,281 A | 12/1996 | Katoh |
| 5,636,609 A | 6/1997 | Fujiyoshi |
| 5,669,357 A | 9/1997 | Denz et al. |
| 5,692,471 A | 12/1997 | Zhang |
| 5,720,257 A | 2/1998 | Motose et al. |
| 5,752,485 A | 5/1998 | Minowa et al. |
| 5,769,054 A | 6/1998 | Schnaibel et al. |
| 5,775,296 A | 7/1998 | Goras et al. |
| 5,778,858 A | 7/1998 | Garabedian |
| 5,791,314 A | 8/1998 | Ito |
| 5,797,384 A | 8/1998 | Kitagawa et al. |
| 5,806,488 A | 9/1998 | Imberg |
| 5,826,563 A | 10/1998 | Patel et al. |
| 5,945,597 A | 8/1999 | Poublon et al. |
| 5,947,095 A | 9/1999 | Kato |
| 5,975,052 A | 11/1999 | Moyer |
| 6,032,650 A | 3/2000 | Rask |
| 6,138,636 A | 10/2000 | Kohno et al. |
| 6,158,411 A | 12/2000 | Morikawa |
| 6,244,242 B1 | 6/2001 | Grizzle et al. |
| 6,247,449 B1 | 6/2001 | Persson |
| 6,273,076 B1 | 8/2001 | Beck et al. |
| 6,354,268 B1 | 3/2002 | Beck et al. |
| 6,360,724 B1 | 3/2002 | Suhre et al. |
| 6,367,443 B1 | 4/2002 | Bassi et al. |
| 6,405,705 B1 | 6/2002 | Dunsworth et al. |
| 6,408,625 B1 | 6/2002 | Woon et al. |
| 6,484,677 B2 | 11/2002 | Leone et al. |
| 6,497,221 B1 | 12/2002 | French et al. |
| 6,606,552 B2 | 8/2003 | Haimeri et al. |
| 6,615,804 B2 | 9/2003 | Matthews et al. |
| 6,619,258 B2 | 9/2003 | McKay et al. |
| 6,619,267 B1 | 9/2003 | Pao |
| 6,655,353 B1 | 12/2003 | Rayl |
| 6,687,602 B2 | 2/2004 | Ament |
| 6,688,281 B1 | 2/2004 | Woolford et al. |
| 6,728,626 B2 | 4/2004 | Maira et al. |
| 6,735,938 B2 | 5/2004 | Surnilla |
| 6,736,108 B2 | 5/2004 | Rayl et al. |
| 6,769,398 B2 | 8/2004 | Surnilla et al. |
| 6,782,865 B2 | 8/2004 | Rayl et al. |
| 6,823,830 B2 | 11/2004 | Azuma |
| 6,823,835 B2 | 11/2004 | Dunsworth et al. |
| 6,868,326 B2 | 3/2005 | Yasui |
| 6,874,462 B2 | 4/2005 | Matthews |
| 6,876,097 B2 | 4/2005 | Thomas et al. |
| 6,937,933 B1 | 8/2005 | Jautelat et al. |
| 6,978,204 B2 | 12/2005 | Surnilla et al. |
| 7,000,602 B2 | 2/2006 | Cullen et al. |
| 7,021,287 B2 | 4/2006 | Zhu et al. |
| 7,028,661 B1 | 4/2006 | Bonne et al. |
| 7,028,670 B2 | 4/2006 | Doering |
| 7,032,545 B2 | 4/2006 | Lewis et al. |
| 7,032,581 B2 | 4/2006 | Gibson et al. |
| 7,044,101 B1 | 5/2006 | Duty et al. |
| 7,058,501 B2 | 6/2006 | Yasui et al. |
| 7,063,062 B2 | 6/2006 | Lewis et al. |
| 7,069,910 B2 | 7/2006 | Surnilla et al. |
| 7,086,386 B2 | 8/2006 | Doering |
| 7,111,593 B2 | 9/2006 | Song et al. |
| 7,133,763 B2 | 11/2006 | Yasui |
| 7,179,199 B2 | 2/2007 | Kushiyama et al. |

(56) References Cited

U.S. PATENT DOCUMENTS

| | | |
|---|---|---|
| 7,225,783 B2 | 6/2007 | Hohnstadt et al. |
| 7,231,907 B2 | 6/2007 | Bolander et al. |
| 7,249,583 B2 | 7/2007 | Bidner et al. |
| 7,275,518 B1 | 10/2007 | Gartner et al. |
| 7,275,916 B2 | 10/2007 | Smith et al. |
| 7,288,046 B2 | 10/2007 | Boone et al. |
| 7,308,962 B2 | 12/2007 | Sen et al. |
| 7,311,079 B2 | 12/2007 | Surnilla et al. |
| 7,350,499 B2 | 4/2008 | Takaoka et al. |
| 7,363,915 B2 | 4/2008 | Surnilla et al. |
| 7,426,915 B2 | 9/2008 | Gibson et al. |
| 7,503,312 B2 | 3/2009 | Surnilla et al. |
| 7,509,201 B2 | 3/2009 | Bolander et al. |
| 7,516,730 B2 | 4/2009 | Ukai et al. |
| 7,532,972 B2 | 5/2009 | Kolmanovsky et al. |
| 7,571,707 B2 | 8/2009 | Gibson et al. |
| 7,577,511 B1 | 8/2009 | Tripathi et al. |
| 7,849,835 B2 | 12/2010 | Tripathi et al. |
| 7,886,715 B2 | 2/2011 | Tripathi et al. |
| 7,891,336 B2 | 2/2011 | Surnilla et al. |
| 7,900,596 B2 | 3/2011 | Hartmann et al. |
| 7,930,087 B2 | 4/2011 | Gibson et al. |
| 7,954,474 B2 | 6/2011 | Tripathi et al. |
| 8,099,224 B2 | 1/2012 | Tripathi et al. |
| 8,131,445 B2 | 3/2012 | Tripathi et al. |
| 8,131,447 B2 | 3/2012 | Tripathi et al. |
| 8,145,410 B2 | 3/2012 | Berger et al. |
| 8,336,521 B2 | 12/2012 | Tripathi et al. |
| 8,464,690 B2 * | 6/2013 | Yuille et al. ............ 123/350 |
| 8,616,181 B2 * | 12/2013 | Sahandiesfanjani et al. . 123/350 |
| 8,651,091 B2 * | 2/2014 | Tripathi et al. .......... 123/481 |
| 8,701,628 B2 * | 4/2014 | Tripathi et al. .......... 123/350 |
| 8,869,773 B2 * | 10/2014 | Tripathi et al. .......... 123/350 |
| 2002/0148438 A1 | 10/2002 | Ellims et al. |
| 2003/0116130 A1 | 6/2003 | Kisaka et al. |
| 2003/0131820 A1 | 7/2003 | Mckay et al. |
| 2003/0139872 A1 | 7/2003 | Miki |
| 2003/0213467 A1 | 11/2003 | Rayl et al. |
| 2005/0182553 A1 | 8/2005 | Miller et al. |
| 2007/0042861 A1 | 2/2007 | Takaoka et al. |
| 2007/0051092 A1 | 3/2007 | Pallett et al. |
| 2007/0051350 A1 | 3/2007 | Pallet et al. |
| 2007/0051351 A1 | 3/2007 | Pallett et al. |
| 2007/0162215 A1 | 7/2007 | Dietl et al. |
| 2007/0272202 A1 | 11/2007 | Kuo et al. |
| 2008/0066450 A1 | 3/2008 | Surnilla et al. |
| 2008/0135021 A1 | 6/2008 | Michelini et al. |
| 2008/0262712 A1 | 10/2008 | Duty et al. |
| 2009/0048764 A1 | 2/2009 | Fuwa |
| 2009/0177371 A1 | 7/2009 | Reinke |
| 2009/0182484 A1 | 7/2009 | Loeffler et al. |
| 2009/0182485 A1 | 7/2009 | Loeffler et al. |
| 2009/0320787 A1 | 12/2009 | Wagner et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0043744 A1 | 2/2010 | Suzuki et al. |
| 2010/0050993 A1 | 3/2010 | Zhao et al. |
| 2010/0100299 A1 | 4/2010 | Tripathi et al. |
| 2010/0286891 A1 | 11/2010 | Huang et al. |
| 2011/0030657 A1 | 2/2011 | Tripathi et al. |
| 2011/0048372 A1 | 3/2011 | Dibble et al. |
| 2011/0208405 A1 | 8/2011 | Tripathi et al. |
| 2011/0213540 A1 | 9/2011 | Tripathi et al. |
| 2011/0251773 A1 | 10/2011 | Sahandiesfanjani et al. |
| 2012/0042633 A1 | 2/2012 | Silvestri et al. |
| 2012/0046853 A1 | 2/2012 | Silvestri et al. |
| 2012/0109495 A1 | 5/2012 | Tripathi et al. |
| 2012/0143471 A1 | 6/2012 | Tripathi et al. |
| 2013/0066502 A1 | 3/2013 | Tripathi et al. |

FOREIGN PATENT DOCUMENTS

| | | |
|---|---|---|
| JP | 2004-270627 | 9/2004 |
| JP | 2006-118428 | 5/2006 |
| WO | 91/02892 | 3/1991 |

OTHER PUBLICATIONS

Written Opinion dated Apr. 17, 2012 from International Application No. PCT/US11/62895.

U.S. Appl. No. 13/309,460, filed Dec. 1, 2011.

Notice of Allowance issued in U.S. Appl. No. 12/501,345 mailed Sep. 11, 2012.

Written Opinion dated Nov. 3, 2009 in PCT Application No. PCT/US2009/050322.

International Search Report dated Nov. 3, 2009 in PCT Application No. PCT/US2009/050322.

International Search Report dated Mar. 14, 2011 in PCT Application No. PCT/US2011/020862.

Written Opinion dated Mar. 14, 2011 from PCT Application No. PCT/US2011/020862.

Klauer, "Lehrstuhl für Angewandte Thermodyamik," Diploma work Rheinish-Westfälischen Technischen, Aachen, Germany, published Mar. 1983.

Japanese Office Action dated Oct. 16, 2012 from Japanese Application No. 2011-517671.

U.S. Appl. No. 12/355,725, filed Jan. 16, 2009.
U.S. Appl. No. 12/405,450, filed Mar. 17, 2009.
U.S. Appl. No. 12/501,345, filed Jul. 10, 2009.
U.S. Appl. No. 12/615,179, filed Nov. 9, 2009.
U.S. Appl. No. 12/615,171, filed Nov. 9, 2009.
U.S. Appl. No. 12/615,232, filed Nov. 9, 2009.
U.S. Appl. No. 12/833,916, filed Jul. 9, 2010.
U.S. Appl. No. 13/004,839, filed Jan. 11, 2011.
U.S. Appl. No. 13/004,844, filed Jan. 11, 2011.
U.S. Appl. No. 13/101,034, filed May 4, 2011.
U.S. Appl. No. 13/101,042, filed May 4, 2011.

Chinese Office Action dated Jul. 11, 2014 from Chinese Application No. 201180005817.2.

* cited by examiner

SKIP FIRE INTERNAL COMBUSTION ENGINE CONTROL

CROSS REFERENCE TO RELATED APPLICATIONS

This application claims priority of Provisional Application No. 61/418,779 filed Dec. 1, 2010. This application is also a Continuation-in-part of U.S. application Ser. No. 13/101,042 filed May 4, 2011, Ser. No. 13/004,839 filed Jan. 11, 2011 and Ser. No. 13/004,844 filed Jan. 11, 2011, each of which are Continuations-in-Part of U.S. patent application Ser. No. 12/501,345 filed Jul. 10, 2009, which is a Continuation-in-Part of U.S. patent application Ser. No. 12/355,725 filed Jan. 16, 2009 which claims the priority of U.S. Provisional Patent Application Nos. 61/080,192, filed Jul. 11, 2008; and 61/104,222, filed Oct. 9, 2008. U.S. application Ser. Nos. 13/004,839 and 13/004,844 also claim priority of Provisional Application No. 61/294,077 filed Jan. 11, 2010. Each of these priority applications are incorporated herein by reference.

FIELD OF THE INVENTION

The present invention relates generally to skip fire control of internal combustion engines and particularly to improved feedback approaches for use in such controllers.

BACKGROUND OF THE INVENTION

Engine control approaches that vary the effective displacement of an engine by sometimes skipping the firing of certain cylinders are often referred to as "skip fire" engine control. In general, skip fire engine control is understood to offer a number of potential advantages, including the potential of significantly improved fuel economy in many applications. Although the concept of skip fire engine control has been around for many years, and its benefits are understood, skip fire engine control has not yet achieved significant commercial success in part due to the challenges it presents. In many applications such as automotive applications, one of the most significant challenges presented by skip fire engine control is vibration control. In general, a stereotype associated with skip fire engine control is that skip fire operation of an engine will make the engine run significantly rougher than conventional operation. The inability to satisfactorily address vibration concerns is believed to be one of the primary obstacles that has prevented widespread adoption of skip fire.

Co-assigned U.S. Pat. Nos. 7,577,511, 7,849,835, 7,886,715, 7,954,474, the referenced priority applications, and others describe a new class of engine controllers that make it practical to operate a wide variety of internal combustion engines in a skip fire operational mode. Although the described controllers work well, there are continuing efforts to further improve their performance and to further reduce the vibration of engines operating under their control. The present application expands upon the earlier patents and describes additional control features and enhancements that may further improve performance in a variety of applications.

SUMMARY OF THE INVENTION

A variety of methods and arrangements for controlling the operation of an internal combustion engine in a skip fire variable displacement mode are described.

In one aspect, the working chamber firing that are selected to deliver the desired engine output are determined at least in part based on torque feedback. The torque feedback may be an indication of the torque output of the engine or the torque experienced at some other location in the drive train. In some embodiments, the torque feedback signal is filtered to remove high frequency components of the torque feedback signal in order to help stabilize the system. The torque feedback signal may be arranged to indicate the instantaneous torque of the engine such that the torque feedback signal has a profile that varies over a period between sequential firing opportunities of the engine. In various embodiments, the torque feedback signal may be obtained (a) directly or indirectly from a torque sensor, (b) using a torque calculator, and/or (c) using appropriate look-up tables based on current engine conditions. In other embodiments the feedback signal may be based on torques seen in other locations within the vehicle, such as in the transmission, the torque converter, the drive shaft, at the wheels, etc. It is noted that detection of the torque at locations within the vehicle at locations outside of the engine may be more closely related to vehicle acceleration which may be desirable in some control schemes.

When a torque calculator and/or look-up tables are used to generate the torque feedback signal, a variety of different parameters may be used by the torque calculator and/or used as indices for the look-up tables. By way of example, the mass air per cylinder (MAC) is generally well suited for use as a look-up table index. In general, the firing history of the specific working chamber being fired at any given time will influence the torque generated by that specific firing. Accordingly, in some embodiments, the firing history may also be used as a factor in the generation of the torque feedback signal.

In some embodiments, the controller used to determine the firing sequence includes a control block arranged to receive an input signal indicative of a desired output and to generate a firing sequence that delivers the desired output. The control block also receives a torque feedback signal that is indicative of the actual torque output of the engine and determines that firings based at least in part on the torque feedback signal. The torque feedback signal may be filtered to remove high frequency components to help stabilize the system.

In another aspect, other operational parameters are used as feedback in the determination of the firing sequence. In yet another aspect, a filter is arranged to filter a feedback signal to provide a filtered feedback signal that is used in the determination of the working chamber firings. In preferred embodiments, the frequency characteristics of the filter are variable. In some embodiments, the control block and the filter have a variable frequency clock that varies as a function of engine speed such that the frequency characteristics of the filter vary as a function engine speed. In another aspect, in some embodiments, one or more registers are provided that help define a transfer function of the filter. The registers are arranged such that values stored in the register may be updated during operation of the engine to thereby dynamically alter the transfer function of the filter during operation. By way of example, the controller may be arranged to load different values into the register when a transmission gear ratio is changed such that the transfer function of the filter varies as a function of the transmission gear ratio. The filter may take a wide variety of forms. By way of example, bandpass filters and a low pass filters work well in many applications.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present invention relates generally to improved feedback used in skip fire engine control. Co-assigned U.S. Pat. Nos. 7,577,511, 7,849,835, 7,886,715 7,954,474, and a number of related patent applications including application Ser. Nos. 13/101,042 and 13/101,034 describe a new class of engine controllers that make it practical to operate a wide variety of internal combustion engines in a skip fire operational mode. Each of these referenced applications is incorporated herein by reference. The present application expands upon the earlier patents and describes additional control features and enhancements that may further improve performance in a variety of applications.

Figure 1:
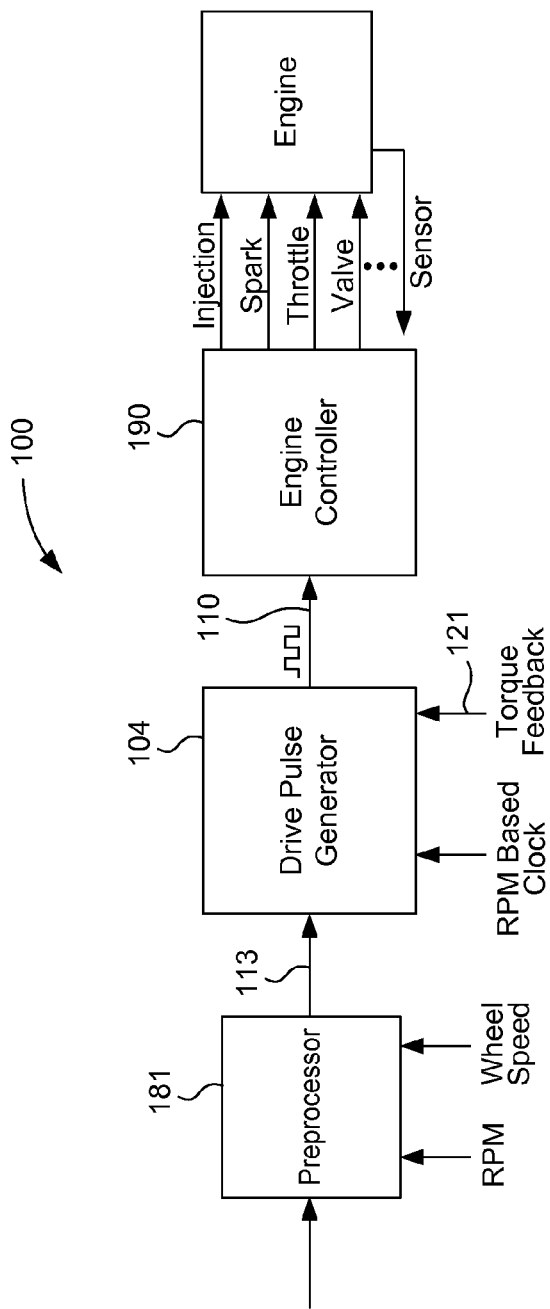
FIG. 1 is a block diagram illustrating an engine firing control unit in accordance with one embodiment of the present invention.

Referring initially to FIG. 1, a representative skip fire engine controller architecture in accordance with one embodiment of the present invention will be described. In the illustrated embodiment, a firing control unit 100 includes a drive pulse generator 104. An input signal 113 that is indicative of a desired engine output is provided to the drive pulse generator 104. The drive pulse generator 104 is arranged to dynamically calculate a drive pulse signal 110 that generally indicates when cylinder firings are required to obtain the desired output. As will be discussed in more detail below, the controller is preferably synchronized with the engine speed so that the generated drive pulse sequence is appropriate to deliver the torque desired at the current engine speed—which may be constantly changing.

In some firing control unit implementations, the torque output of the engine is used as the primary feedback loop within the drive pulse generator. The torque may be the actual torque output of the engine or an estimated torque output. The actual torque output may be a measured output derived from a torque sensor, or a calculated torque output based on current engine parameters, etc. The illustrated drive pulse generator 104 receives feedback of the torque output of the engine in the form of torque feedback signal 121 and uses the torque feedback to insure that the desired engine output is actually attained. In other embodiments, the primary feedback may be an indication of the working chamber firings or other suitable inputs such as wheel speed, engine speed, transmission speed, accelerometer readings, etc. In still other embodiments, feedback may be provided to the drive pulse generator from multiple sources including more than one of the foregoing sources. Such feedback may be scaled in a variety of manners to meet the needs of any particular application.

In some of embodiments, a signal from the accelerator pedal position may be treated as the indication of the desired engine output that is used as the input to the drive pulse generator 104. In such embodiments, the desired engine output signal 113 can be taken from a pedal position sensor on the vehicle. In other embodiments such as the embodiment illustrated in FIG. 1, the accelerator pedal position sensor signal may be provided to a preprocessor 181. The preprocessor may either generate its own signal based on the inputs or do some level of processing on the pedal sensor signal. The output of the preprocessor 181 would then be used as the input 113 to the drive pulse generator. The exact nature of the preprocessing that will be appropriate for any particular implementation may vary widely. By way of example, in different implementations it may be desirable to scale the pedal signal as a function of appropriate factors such as current engine speed, wheel speed, the transmission gear ratio that the vehicle is currently in, etc. In some embodiments, it may be also be desirable to filter the input signal 113 using an anti-aliasing filter or other filters to improve drivability or reduce NVH (noise, vibration, harshness). Such filters may be provided within the preprocessor 181 or separately from the preprocessor.

The drive pulse signal 110 may be used directly to control the firing of an engine, or it may be provided to an engine controller 190, (e.g., an engine control unit (ECU)) which directs the actual firings. In the illustrated embodiment, the engine control unit 190 is arranged to control the engine components such as the fuel injectors, the spark timing, the throttle position, valve timing etc. in a generally conventional manner except that the components are controlled in a manner suitable for skip fire operation. As described in the referenced patents and patent applications, in many operating conditions, the engine may be controlled such that the firing are generally optimized to provide the highest thermodynamic efficiency or in other suitable manners. In some conditions (e.g. at generally lower engine speeds) it may be desirable to run the engine in a skip fire mode under less than an optimal working chamber conditions. Furthermore, at various times, (e.g. during engine warm-up, at idle or at very, low engine speed, when braking, etc.) it may be desirable to operate the engine in a conventional mode that doesn't skip any firings.

Reducing Vibrations in Skip Fire Control

As mentioned above, vibration concerns have traditionally been a significant deterrent to the implementation of skip fire type engine control. When fixed firing patterns are used, the firing patterns can be selected in a manner that seeks to minimize vibrations, but in practice, restricting the available firing patterns to a limited number of acceptable firing patterns tends to unduly restrict performance. Additionally, transitions between different firing patterns can introduce undesirable vibrations and/or performance characteristics which are difficult to manage. When the firing sequence is dynamically determined as in the present invention, there is always a risk that firing sequences will be generated that have undesirable vibration characteristics.

In automotive design, a great deal of effort is typically undertaken to minimize vibrations and particularly the types of vibrations that are most perceptible by occupants of the vehicle. Vibrations are introduced through vehicle components, such as the engine, drive train, transmission, etc. Depending on the origin of the vibrations, they may be transmitted to the vehicle occupant(s) through various vehicle components. For example, vibrations in the engine are transmitted to the chassis, from the chassis to the seats and from the seats to the vehicle occupants. The transfer functions between the vibration source and the vehicle occupant(s) will vary significantly from vehicle to vehicle and are based on a number of factors.

There have been a number of studies on the impact of vibrations on passenger comfort. By way of example, some studies have suggested that vibrations in the range of 0.5 to 3.5 Hertz tend to have the greatest impact on human comfort. See, e.g., ISO 2631-1 (Mechanical vibration and shock—Evaluation of human exposure to whole-body vibration) and BS6841 (Guide to measurement and evaluation of human exposure to whole-bodied mechanical vibration and repeated shock). Depending on the direction and effected body parts, the vibration frequency ranges of most concern can vary. If a skip fire firing pattern generated by the engine of a passenger vehicle has frequency components in specific ranges that are of particular concern, (e.g. 0.5 to 3.5 Hertz), then the resulting vibrations are more likely to have an adverse impact on passenger comfort.

In one aspect of the present invention, in order to help reduce undesirable vibrations, the drive pulse generator 104 is arranged to alter the drive pulse signal in a way that suppresses frequency components in frequency ranges that are of concern. In principle, the drive pulse generator 104 may be arranged to detect undesirable frequency components in the drive pulse signal. The undesirable frequency components are then fed back appropriately within the drive pulse generator in a manner that will suppress the generation of the undesirable frequency components. As will be appreciated by those familiar with digital signal processing, this is effectively noise shaping. In general, the drive pulse generator 104 may be designed to suppress undesirable frequency components in most any frequency range.

Figure 2:
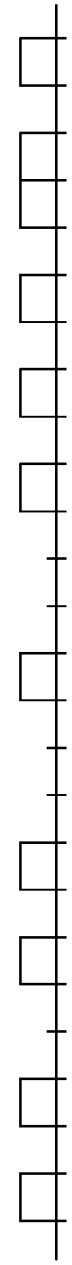
FIG. 2 illustrates a representative drive pulse signal as viewed in the time domain.

Referring next to FIG. 2, a hypothetical drive pulse signal 210 is illustrated. The drive pulse signal conceptually takes the form of a sequence of signals that are synchronized with engine firing opportunities that indicate when working chamber (e.g. cylinder) firings are appropriate to deliver the designed output. In the illustrated embodiment, the drive pulse signal can be viewed as a sequence of high and low signals in which the high signals indicate when cylinder firings are appropriate and the low signals indicate when cylinder firings should be skipped. The most intuitive way to view the drive pulse signal 210 is in the time domain as illustrated in FIG. 2. That is, to view the drive pulse signal as a sequential series of pulses that are separated in time. However, from a signal processing standpoint, the drive pulse signal can also be viewed in the frequency domain. In the frequency domain, the drive pulse signal can be viewed as the combination of a number of frequency components. Any frequency components of the drive pulse signal 210 that are in a frequency range of concern can generate undesirable engine vibrations. As will be described in more detail below, digital signal processing may be used within the drive pulse generator to suppress the frequency components of concern.

In some implementations, the frequency range of concern for a specific feedback may be static. That is, one or more specific frequency ranges (e.g., 1-6 Hz; 0.5-3.5 Hz, 1-12 Hz, etc.). These frequency range(s) of concern may readily be isolated using an appropriate filter, as for example, a band pass filter, or if more than one discrete frequency range is of concern, a multiple band pass filter. In other implementations, the frequency ranges of concern may be variable. For example, the frequency range of concern may vary as a function with engine speed or some other variable (e.g. wheel speed, gear, etc.) or a combination of variables. Variable frequency ranges of concern can readily be isolated using an appropriate variable filter.

Sigma Delta Converter Example

Figure 3:
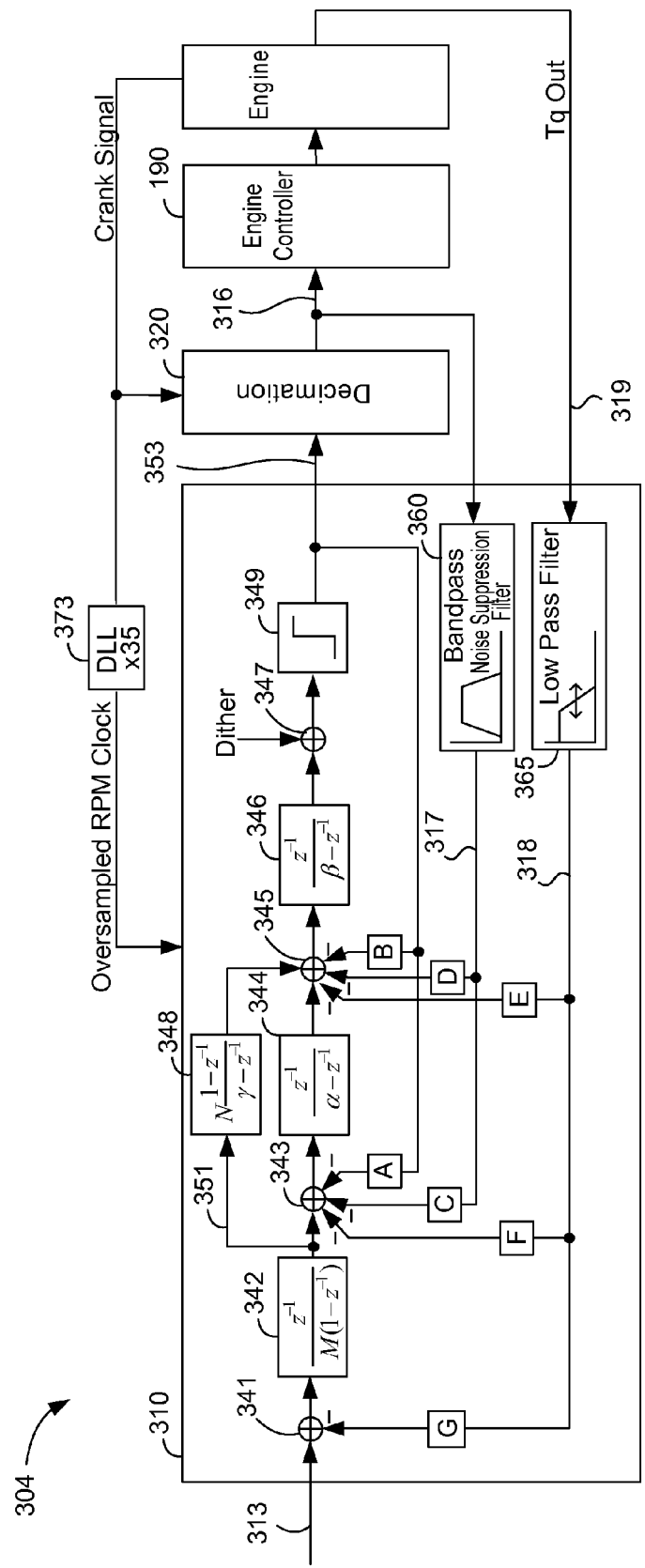
FIG. 3 illustrates a particular sigma delta based drive pulse generator in accordance with one embodiment of the present invention.

Referring next to FIG. 3, an exemplary implementation of a firing control unit that incorporates noise suppression and utilizes torque in the feedback loop will be described. The illustrated firing control unit utilizes a sigma-delta converter based drive pulse generator 304.

The drive pulse generator 304 is arranged to receive an input signal 313 indicative of a desired engine output torque and to output a drive pulse signal 316 indicative of desired engine firings that are suitable for delivering the desired output. The drive pulse generator 304 includes a sigma-delta converter 310 and a decimator 320. Sigma-delta converter 310 receives an input signal 313 (which may be an analog signal) that is indicative of a desired engine output and outputs an oversampled digital converter signal 353 that represents the input signal 313. The decimator 320 serves as a synchronizer to synchronize the output of the sigma-delta converter 310 with engine firing opportunities. Since sigma-delta conversion of the type illustrated is generally known and understood, the following description sets forth the general architecture of a suitable converter. However, it should be appreciated that there are a wide variety of different sigma-delta converters that can be configured to work very well for a particular implementation.

The illustrated sigma-delta converter 310 is a digital third order sigma-delta circuit generally based on an architecture known as the Richie architecture. However, it should be appreciated that higher or lower order converters may be used as well (e.g., $1^{st}$ order, $2^{nd}$ order, $4^{th}$ order, $5^{th}$ order or higher). The illustrated sigma delta converter 310 includes a series of three integrators (stages) 342, 344 and 346 that feed a comparator 349. Adders 341, 343, 345 and 347 are respectively provided before each of these components. A feed-forward path is also provided between the first and third integrators 342, 346 that passes through a fourth integrator 348. The comparator output signal 353 is provided to decimator 320 and may also be used as feedback within the sigma delta converter—and particularly to the second and third integrators 344, 346 in the illustrated embodiment. Appropriate gains "A" and "B" are also applied to the comparator signal before they are fed back to integrators 344, 346.

In the illustrated embodiment, the clocks for both the sigma delta converter and the decimator are based on engine speed. More particularly, the frequency of the decimator clock may be synchronized with the engine firing opportunities. The frequency of the sigma-delta converter clock is an integer multiple of the decimator clock so that is the sigma-delta converter is oversampled relative to the decimator output. The frequency of the sigma-delta converter colock may be provided by a digitally locked loop (DLL) 373 or other suitable mechanism that increases the crank signal frequency by a predetermined multiple. At the same time, the sigma-delta converter is synchronized with the decimator which in turn is synchronized with the engine speed. In embodiments that utilize instantaneous torque feedback as described below, it is believed that oversampling on the order of 10 to 100 times are suitable with an oversampling ratio of 35 being used in one particular implementation. Although specific oversampling factors have been described, it should be appreciated that the oversampling factor may be widely varied to meet the needs and preferred design tradeoffs of any particular design. Also, the converter clock does not need to be variable based on engine speed, although the use of a synchronized converter clock helps simplify the synchronizer design and eliminates another potential source of noise.

In the illustrated embodiment, the drive pulse signal 316 output of the decimator 320 is used to directly dictate the engine firing sequence (although the actual firings may optionally be directed by the ECU). However, it should be appreciated that in other embodiments, a sequencer may be utilized to further alter the firing sequence relative to the sequence defined in by the drive pulse generator. The function of the optional sequencer is described in more detail in the incorporated patents and patent applications.

The drive pulse signal 316 is also fed back to the sigma delta block 310 where it is passed through a filter 360. The filtered signal 317 is then applied with appropriate gain "C" and "D" as negative feedback to adders 343 and 345. The function of the drive pulse signal filter 360 will be described in more detail below.

In the illustrated embodiment, the control loop in sigma-delta converter 310 is based primarily on torque. In the described embodiment a signal 319 indicative of the instantaneous torque is used as the primary feedback for the sigma-delta converter. The instantaneous torque can be obtained from any suitable source. For example, if a torque sensor is available on the engine, the torque sensor output can be utilized directly. In other applications, the torque profile may be calculated or retrieved from a suitable lookup table based on current engine conditions. It should be appreciated that the instantaneous torque signal 319 inherently provides feedback of the firings as well since the torque spikes significantly with each firing.

When desired, the instantaneous torque signal 319 may be passed through an appropriate filter (e.g., low pass filter 365) before it is fed back to one or more of the integrators. The function of torque signal filter 365 will also be described in more detail below. In the embodiment of FIG. 3, the filtered instantaneous torque signal 318 is illustrated as being provided with appropriate gain "G", "F", "E" as negative feedback to the first through third integrators 342, 344, 346 respectively.

It should be appreciated that the appropriate magnitude of the gains for the feedback signals and the appropriate transfer functions within each integrator will vary significantly based on the design of the engine, the desired control characteristics, etc. The appropriate values can be determined experimentally for a particular application by simulation or in other suitable manners. In some instances, the gain for the feedback to one or more of the integrators may be zero. That is, the feedback to some of the integrators may be eliminated. For example, in some implementations it may be desirable to set the values of "B" and/or "E" at zero. In other implementations "C" and/or "F" can additionally or alternatively be set to zero.

A goal of the illustrated architecture is to close the feedback loop based on torque and to adjust the components in such a way that the sigma-delta converter is stable for all relevant input levels. Some of the main hurdles to loop stability are the inherent delays imparted by the engine and to a lesser extent, the decimator. Another challenge is presented by the nature of the torque profile.

It should be appreciated that due to the mechanical nature of the engine, there will always be some delay between a decision to fire a particular working chamber (as reflected in the drive pulse signal 316) and the realization of the torque that is generated in response to that firing command. For example, in conventional four-stroke piston engines, the delay will typically be over 360 degrees due to the general necessity to inject the fuel more than one full crankshaft rotation before the cylinder is fired (e.g. in port injection engines), and further delays are introduced by the nature of combustion and the expansion stroke which are not instantaneous. Thus, a reasonable approximation for a 4-stroke piston engine might be that the decision to fire a particular cylinder might occur on the order of 600 degrees of crankshaft rotation before the torque is delivered. These types of delays challenge the stability of the loop. One way to help compensate for these types of delays is to reduce the gain of integrator 342 (e.g., by increasing gain constant "M" in the illustrated embodiment).

From a control standpoint, the delay issue and other instabilities may be addressed in part by inserting a "feed-forward zero" and "pole splitting" in the sigma-delta converter 310. In the illustrated embodiment, a feed forward zero is inserted through the use of integrator 348 in feed forward path 351 with appropriate gain and zero location, although it should be appreciated that "zeros" can be introduced to the controller in other suitable manners as well. In the illustrated embodiment, the zero location is set by assigning the value of the variable γ appropriately. The poles are split over the band of interest in a manner that helps stabilize the loop. In the illustrated embodiment, the poles are split by selecting the appropriate values for α and β.

It has been observed that in higher order converters, the jitter that is inherent in the use of a variable clock can be another source of undesirable noise within the system. The split poles can also be arranged to help compensate for noise introduced by such jitter.

It should be appreciated that the specific values that are appropriate for use as the various variables (e.g., the gains, poles and zeros) can vary widely based on a variety of factors including the nature of the engine being controlled, the characteristics of the vehicle and desired design specification. By way of example, the appropriate gains used in the various feedback loops (e.g. gains "A" to "G"), the feed forward gains (e.g., "N") and the gain used in each of the stages (e.g., 1/M) will typically vary with the type of engine being controlled (e.g., 4 cylinder, 6 cylinder, etc.) and desired performance characteristics. The desired location of the poles and zeros (e.g., α, β and γ) will typically vary from vehicle model to model and vibration considerations.

When desired, dither may be introduced at an appropriate location within the system. In the illustrated embodiment, dither is introduced at an adder 347 located between the third integrator 346 and the comparator 349. However, in other embodiments, dither may be introduced at a variety of other locations (e.g., in the preprocessor or otherwise before the desired output signal 313 is introduced to the first integrator 342) or may be eliminated altogether.

Vibration Suppression

As pointed out earlier, vehicle occupants tend to perceive vibrations in certain frequency ranges. There has been extensive research on the impact of different types of vibrations on occupant comfort and there are differing views on exactly what frequency ranges are of particular concern although often frequency ranges on the order of 0.5 to 15 Hz (and possibly more narrowly 0.5 or 1 to 3.5 or 6 Hz) are cited as being of particular concern. Accordingly, in some applications it may be desirable to suppress frequency components within the firing sequence that are likely to generate vibrations in a frequency range of concern. Band-pass filter 360 is arranged to facilitate such suppression.

More specifically, the drive pulse signal 316 is fed back to the sigma delta converter 310 through band-pass filter 360. The band-pass filter 360 is arranged to pass frequency components of the drive pulse signal 316 that are considered most likely to contribute to the generations of vibrations in the frequency range of concern that could be felt by the passenger. The output of the band-pass filter 360 is filtered signal 317 which provides an indication of "noise" (frequency components) generated by the firing sequence in the frequency range of concern. In the illustrated embodiment, the filtered signal 317 is applied as negative feedback to adders 343 and 345 within the sigma delta converter 310 using appropriate gains "C" and "D" respectively. The adders 343 and 345 in turn feed the second and third integrators 344 and 346 respectively. As will be apparent to those familiar with controller design, the negative feedback provided by feedback signal 317 thus serves to help suppress the generation of firing sequences having frequency components in the frequency ranges that are passed through band-pass filter 360 (i.e., firing sequences having frequency components in the undesirable range(s)).

It should be appreciated that there can be complex transfer functions between the engine and the passenger seats, so for a specific engine, the frequency components that are passed through band-pass filter 360 are not necessarily the same as the vibration frequencies that are of greatest concern for the passengers. Furthermore, the appropriate transfer functions may vary significantly based on the engine and vehicle design. Therefore, the band-pass filter 360 may preferably be customized for any particular vehicle make and model. In some implementations, the frequency range of concern for a specific feedback may be static. That is, one specific frequency range (e.g., 0.5 to 3.5 Hz; 0.5 to 6 Hz; 1-15 Hz etc.) or multiple isolated frequency ranges. These frequency range(s) of concern may readily be isolated using an appropriate filter. In such embodiments, band-pass filter 360 may be implemented as a simple band pass filter or a multiple band pass filter. In other implementations, the frequency ranges of concern may be variable. For example, the frequency range of concern may vary as a function with engine speed or some other variable (e.g. wheel speed, transmission gear ratio) or a combination of variables. Variable frequency ranges of concern can readily be isolated using an appropriate variable filter. As will be appreciated by those familiar with noise shaping in digital signal processing, the range of band pass filter 360 should preferably be within the bandwidth of the sigma delta converter to help insure stability of the control loop.

It is noted that in the embodiment of FIG. 3, the filter 360 (as well a filter 365 discussed below) are variable filters in the time domain because they are illustrated as being within the sigma-delta converter 310 which has a variable clock based on engine speed. It should be appreciated that using the same filters with a steady (fixed) clock would result in a static filter. Such a static filter could readily be provided by placing the filters 360 and 365 outside of the sigma-delta converter, or by using a fixed clock in the sigma-delta converter or in a variety of other suitable manners.

In addition to suppressing vibrations (noise) generated by the choice of firing sequences, the described techniques can be useful in suppressing vibrations that may arise from other sources or that may be sensed at various locations in the vehicle. For example, if an accelerometer is used as the feedback source, it may sense road vibrations, which may then be suppressed by the control system. Thus, the controller can readily be configured to use inputs other than simply the firing sequence to help suppress vibrations of concern. In some embodiments, these other inputs may be used in place of the drive pulse signal 316. In other embodiments, a parallel feedback path (not shown) may be used in addition to the drive pulse signal 316. By way of example, vehicle accelerometer sensors, wheel speed or acceleration sensors, torque sensors, or sensors indicative of the speed, acceleration or torque of other components in the drive train may be used in such embodiments.

Torque Feedback

As mentioned above, in some implementations, the torque output of the engine is used in the drive pulse generator's primary feedback loop. In general, the torque obtained from each cylinder firing will vary as a function of a number of variables. The main influence on the amount of generated torque is the mass of air delivered to each cylinder, which is affected by engine speed, intake manifold air temperature and pressure, exhaust manifold pressure, valve timing, etc. Other factors include the nature of the fuel being used, mixture ratios, etc. The actual torque generated by each cylinder firing may also vary from firing to firing based on the firing history of that particular cylinder. That is, the firing history associated with each cylinder will have an impact on the torque that will be generated by the next firing of that cylinder. For example, under similar conditions, a cylinder that was skipped in the immediately preceding firing opportunity will generate more torque than if it had been fired in the immediately preceding firing opportunity. A cylinder that was skipped in the previous two firing opportunities will typically generate more torque than a cylinder that was skipped just once and so on, although a limit is approached relatively quickly. Our simulations suggest that the actual torque output of any particular firing may vary on the order of up to 15% based on the cylinder's previous firing history alone in otherwise steady state engine operation.

Cylinder management factors can also have an impact on the actual torque produced by a firing. For example, a cylinder that is filled with air and effectively used as a spring during one or more skipped working cycles may have a different actual torque output than a cylinder that is filled with air immediately before the cylinder is fired in the normal course due in part to the leakage of air from the skipped cylinder. Other factors that influence the amount of air that is present in any particular fired cylinder may have an impact on the amount of torque generated by each firing as well.

Figure 4:
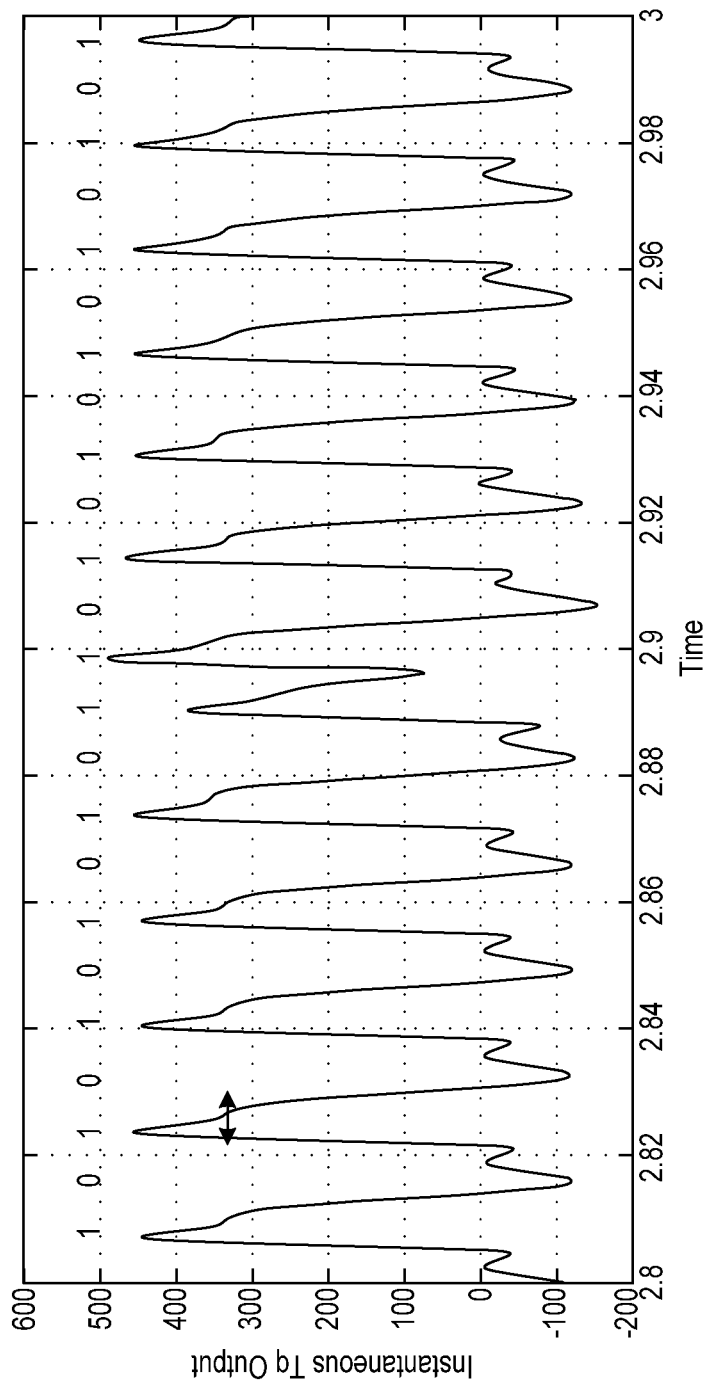
FIG. 4 is a graph illustrating the instantaneous torque generated by a particular firing sequence.

In the embodiment of FIG. 3, a torque sensor is used to measure the instantaneous torque output of the engine. In practice, the actual instantaneous torque output of the engine will vary significantly over the course of each firing cycle. This is due to a number of factors including the timing and characteristics of combustion, pumping losses, etc. By way of example, FIG. 4 illustrates the actual output of an engine over the course of a simulated firing sequence. It should be appreciated that the actual torque profile often has some high frequency components. Since the described sigma-delta converter is very responsive, these high frequency components—which may include periods of negative torque (e.g., during compression), can potentially introduce instabilities to the converter. Torque signal filter 365 is provided to filter the torque signal in a manner that helps eliminate these instabilities. The specific form of the torque signal filter 365 may be varied widely. By way of example, in the illustrated embodiment, torque signal filter 365 may take the form of a low pass IIR (Infinite Impulse Response) filter. In other embodiments, the filter may be a band-pass filter or a variety of other suitable designs. In one specific example, the cutoff frequency for a variable filter 365 used in a drive pulse generator for a 4 cylinder engine may be set at approximately 6 Hertz. In some implementations, the cutoff frequency of the torque signal filter 365 may vary as a function of engine speed. This can be useful because the frequency of the instantaneous torque variations will typically vary with engine speed. In one example, the cutoff frequency for a variable filter 365 used in a drive pulse generator for a 4 cylinder engine may be set at approximately 6 Hz when operating at 2000 RPM and vary linearly with variations in engine speed (e.g., in this example, the frequency threshold would be 12 Hz at 4000 RPM and 3 Hz at 1000 RPM). Of course, the specific thresholds and/or variability functions may be widely varied to meet the needs of any particular application.

The filters 360 and 365 may also be adaptable based on the transmission gear ratio that the vehicle is in at any given time. As will be appreciated by those familiar with the human factors of vehicle design, the transfer function relating to vibration transmission between a vehicle chassis and a vehicle occupant will typically vary based on the gear that the vehicle is in at any time. To help address these variations, the filters 360 and 365 may be designed to implement different filter transfer functions based on the gear that the vehicle is in at any given time and again, the different transfer functions may vary with engine speed. This may readily be accomplished by loading appropriate values in registers of the sigma-delta converter that are arranged to define the desired filter transfer function(s). That is, the values stored in the registers used to define the filters 360 and 365 may be rewritten as appropriate each time the gear is changed. Of course, the filter adjustments can be implemented in a wide variety of other manners as well. The specific filter transfer functions that are appropriate for any particular vehicle in any specific gear can vary significantly in accordance with the vehicle design. When the sigma-delta converter has a clock that varies with engine speed, from a design standpoint it is typically easier to implement a filter that varies with engine speed. Thus, if a fixed filter is desired in such implementations, it may be desirable to filter the torque signal outside of the sigma-delta converter (i.e., before the torque signal is fed to the sigma delta converter). Alternatively, interpolation from an engine speed based clock to a fixed time clock may be done.

Figure 5:
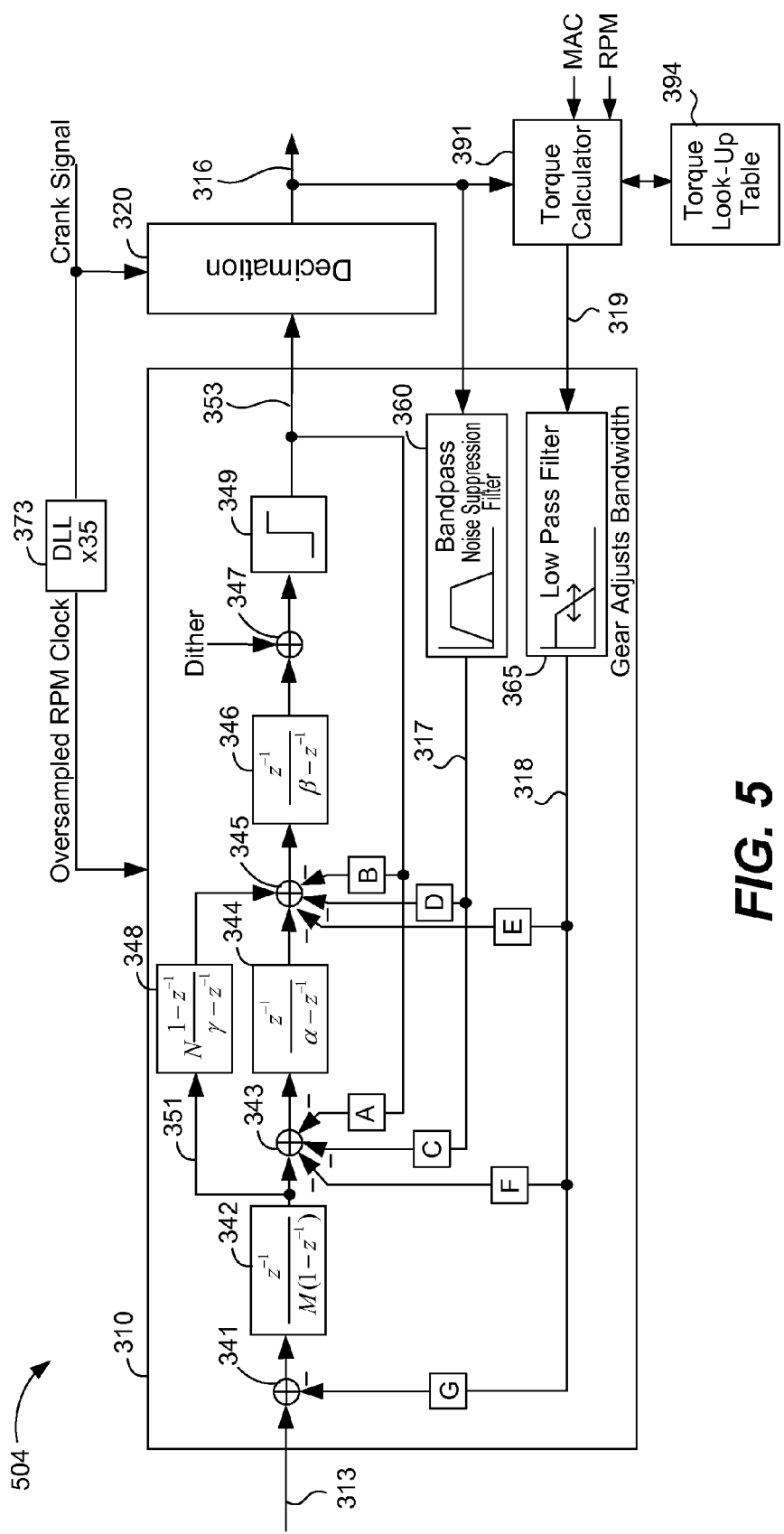
FIG. 5 illustrates an alternative drive pulse generator embodiment that uses lookup tables to determine torque feedback.

FIG. 5 illustrates an alternative drive pulse generator embodiment. This embodiment is quite similar to the embodiment described above with respect to FIG. 3 except that instead of using the actual sensed torque, a torque calculator 391 is used to estimate the actual torque provided by each firing. In this embodiment, the drive pulse signal 316 is provided to the torque calculator 391 in addition to the engine. The torque calculator 391 also receives inputs indicative of various engine conditions and/or settings that influence the amount of torque that will be generated by each firing, and determines the amount of torque that is provided by each firing. The determined torque value is then applied as torque feedback signal 319.

As will be appreciated by those familiar with the art, the torque profile associated with any given firing of the cylinder under any given condition can be estimated based on selected current engine operating parameters. For example, mass air in cylinder (MAC) and engine speed (RPM) can often be used to estimate the torque that will be generated by any given firing. In the illustrated embodiment, the torque profile associated with each firing is obtained from a lookup-table 394. The lookup-table 394 can have indices based on the engine parameters such as mass air in cylinder (sometimes referred to as a mass air charge) and engine speed that most significantly affect the torque provided by each firing.

It should be appreciated that there are a number of factors that affect the amount of torque that will be provided by each working chamber firming. In addition to mass air charge and engine speed, valve timing, intake manifold pressure, exhaust manifold pressure, fuel energy content, manifold air temperature, etc. will have an impact on the actual amount of torque derived from each firing. Also, as mentioned above, the firing history of the associated cylinder can have a significant influence on the amount of torque generated by any firing. Therefore, the actual torque provided by each firing can more accurately be estimated through the use of multi-dimensional lookup tables having indices that account for more of the variables that influence the actual torque provided by any given firing. Such tables can be derived either empirically or analytically and the derivation and accessing of such look-up tables will be readily understood by those familiar with the art.

When look-up tables (LUTs) are used to determine the torque profile associated with each firing opportunity, a variety of different variables may be used as indices for the look-up tables and/or the look-up tables may be multi-dimensional tables that utilizes multiple indices. By way of example, intake mass air charge and engine speed are useful indices for the look-up tables, since both have a significant impact on the torque provided by any particular firing. Of course many other variables have an impact as well and those variables can also or alternatively be used as indices for the lookup table. As mentioned above, the firing history associated with the particular cylinder being fired can also have a significant impact on the torque that is actually generated by a particular firing. Therefore, it can also be useful to have a look-up table dimension that is based on firing history. When this approach is taken, the amount of firing history that is used as part of the lookup can be varied significantly. However, the dominant factor is the number of firing opportunities in a row that the specific cylinder being fired skipped (if any) prior to the present firing. Therefore, a simple implementation of a firing history based look-up table would have counters (not shown) associated with each working chamber that count the number of firings that are sequentially skipped for that cylinder. The skipped firing count is then used as one lookup table index for each directed firing of the associated working chamber. Of course, in alternatively embodiments, more sophisticated firing history tracking can be used in conjunction with the look-up table 394.

In many implementations it may be desirable to have a separate look-up table for each cylinder (e.g., six look-up tables in a 6 cylinder engine) so that the torque contribution of each cylinder can be tracked more accurately. The output of the various lookup tables can then be added to create the final torque feedback signal 319.

The nature of the torque feedback provided during each firing opportunity can also be widely varied. For example, in a simple embodiment, a properly scaled torque feedback value that is substantially constant over the period associated with each individual firing opportunity may be used. That is, the torque feedback associated with any particular firing may be substantially constant for a period of time until the next firing opportunity occurs. In such an approach, torque output during skipped firing opportunities may be estimated as zero torque. Although such a constant level feedback can work adequately for control purposes, the reality is that the actual torque varies quite significantly over the period associated with each firing opportunity. Thus, modeling the torque feedback as constant over the period of the firing opportunity introduces certain rounding errors into the controller. Although these rounding errors do not tend to adversely affect the ability of the controller to deliver the desired output, in higher order controllers, they may affect responsiveness and can potentially become a source of unwanted noise and vibrations. Therefore, the precision of the control can be improved by more accurately reflecting the actual torque profile of the engine in the torque feedback signal 319. To accomplish this, the lookup table may be arranged to provide feedback in the form of a torque profile that simulates the torque variations that occur over the period between sequential firing opportunities. It should be appreciated that the torque profile associated with any particular firing may vary as a function of engine speed and some of the other factors described above.

It should also be appreciated that the torque of the engine will not be zero during skipped working cycles. Rather, pumping effects (e.g. compression and expansion that may be occurring in the various cylinders), frictional losses and other factors will impact the overall engine torque. Thus, even skipped firings will have an associated torque profile. Therefore, to accurately track the output of the engine, it is desirable to model the torque implications of skipped working cycles as well as fired working cycles. The separate look-up tables for each working chamber approach discussed above is well suited for tracking the torque contributions of each cylinder during both fired and skipped working cycles.

One advantage of using look-up tables to estimate the torque provided by each firing is that the torque feedback provided to the drive pulse generator does not need to be delayed until the actual firing. Rather, the feedback can be provided immediately or as soon as practical after a determination has been made to fire a particular cylinder. This can be used advantageously to help reduce instabilities that may be introduced by the extended delay that would naturally occur between the determination that a particular cylinder is to be fired and the actual firing of that cylinder.

In still other embodiments torque can be estimated dynamically from other sources. As will be appreciated by those familiar with current engine design, very few current production vehicles have built-in torque sensors. However, most production vehicles do have crankshaft sensors that are used to measure engine speed and can be used to determine crankshaft acceleration. More specifically, combustion engines are typically equipped with a crank wheel which has a fixed number of teeth spread evenly around the wheel. The speed of rotation of the crank wheel is derived by measuring the rate at which the teeth cross a sensor, generally a Hall-effect sensor. The crankshaft rotates in response to the cylinder firings, and its rate of angular acceleration is proportional to the torque applied to the crank. The applied torque is the sum of the engine torque, due to cylinder firings, and load torque, determined by the load imposed on the crank through the transmission, which is gear and road load-dependent. The transmission gear ratio is a known parameter, which can be detected, for example, from the transmission electronically. For a given gear, the engine torque is therefore proportional to the acceleration of the crank. Variations in engine torque will be seen as proportional variations in the crank acceleration.

The acceleration of the crank wheel is determined by computing the time derivative of the crank wheel angular velocity, measured, for example, in rpm. Since the rpm will vary dynamically in response to every cylinder firing torque pulse, it is desirable to average the instantaneous rpm reading over several samples representing several degrees of crank rotation. For example, for an 8 cylinder engine, where firings can occur every 90 degrees, the rpm can be averaged over 90 degrees (angle-domain processing) or over an amount of time representing 90 degrees at the lowest rpm of interest (time-domain processing).

When desired, a torque calculated in this manner (or using any other suitable torque calculation approach) may be utilized in a suitable torque feedback loop.

In the discussion above, the torque sensors and/or torque calculators are designed to sense/determine the engine torque. However, it should be appreciated that in other embodiments the torque feedback signal may be based on torques present at other locations in the drive train, as for example, in the transmission, the torque converter, the drive shaft, an axle or at the wheels. Like engine torque, the actual values used within the drive pulse generator may be sensed values, calculated values, values retrieved from look-up tables or values that are estimated in other manners. When torques from other sources are used as the input for the primary feedback loop, the design of the drive pulse generator may be substantially the same as the designs illustrated in FIG. 3, 5 or 6 (or any other suitable controller design) although the specific values used as the transfer functions within the integrators and the various gain constants will typically differ based on the source of the torque utilized in order to facilitate optimization of the control loop. Similarly, it may be desirable to adjust the frequency characteristics of the filter 365 based on the nature of the feedback signal. Therefore, it should be appreciated that although the primary described embodiments utilize engine torque in the feedback loop, torque derived from other components in the drive train or at the wheels may readily be used in the primary control loop in place of the engine torque.

Furthermore, in the discussion above, torque is utilized as the feedback signal in the primary feedback loop. However this is not a requirement. Rather, in other embodiments, other parameters may be used in the primary feedback loop. For example, in some embodiments, the primary feedback loop may be an indication of the working chamber firings. Such feedback may be requested firings (e.g. the drive pulse signal 110, 316), or an indication of an actual firing. In still other embodiments, the signals used in the primary feedback loop may be based on other parameters such as engine speed, wheel speed, or the rotational speed of some other component within the drive train; an acceleration such as angular acceleration of the engine (e.g., at the crankshaft), an angular acceleration at the wheels, or an angular acceleration at some component of the drive train (e.g., at the transmission, the torque converter, the drive shaft, an axle, etc.); vehicle acceleration (which may be obtained from an appropriate accelerometer on the vehicle); other differentiated signals, etc.

Figure 6:
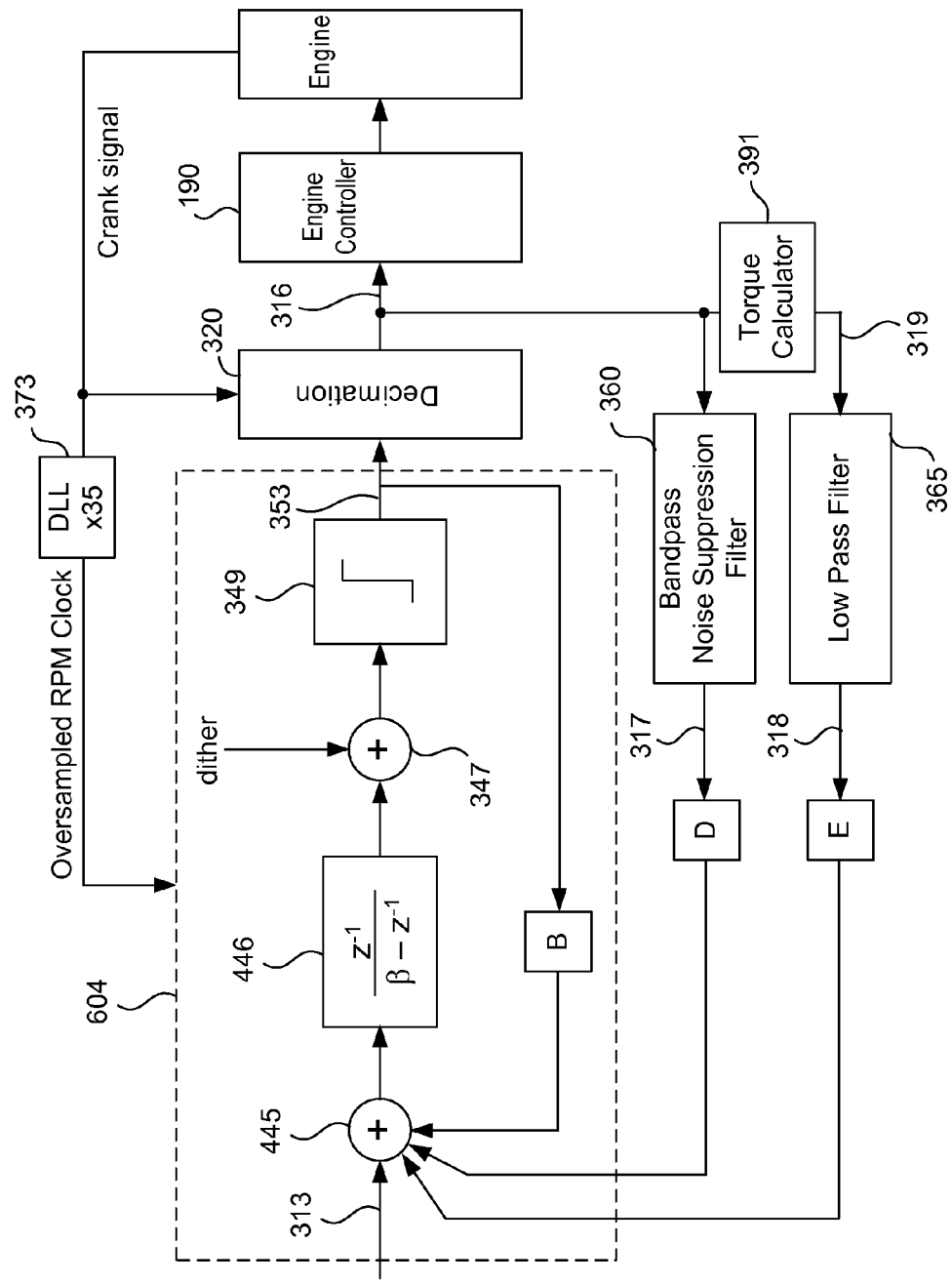
FIG. 6 illustrates another alternative drive pulse generator embodiment that utilizes a first order sigma delta based converter.

When any of these other sources are used as the input for the primary feedback loop, the design of the drive pulse generator may again be substantially the same as the designs illustrated in FIG. 3, 5 or 6 (or any other suitable controller design) although again, the specific values used as the transfer functions within the integrators and the various gain constants will typically differ based on the source of the signal utilized in order to facilitate optimization of the control loop. Similarly, it may be desirable to adjust the frequency characteristics of the filter 365 based on the nature of the feedback signal. Therefore, it should be appreciated that although the primary described embodiments utilize engine torque in the feedback loop, control signals derived from other components of the vehicle may readily be used in the primary control loop in place of the engine torque.

OTHER EXAMPLES

Referring next to FIG. 6, another representative embodiment will be described. In this embodiment, a first order sigma delta converter 604 is used within the drive pulse generator. This embodiment has a configuration very similar to the previously described embodiments except that the outputs of comparator 349 and filters 360 and 365 are only fed back to the sole integrator 446 through adder 445 with appropriate gains B, D and E. In other respects, the drive pulse generator may operate similarly to the previously described embodiments. Like in the previously described embodiments, band pass noise suppression filter 360 is arranged to help suppress frequency components of concern in the firing sequence by providing appropriate feedback to the integrator 446. In this embodiment, torque feedback (or other appropriate feedback) may be used in the primary feedback loop. When torque is used in a feedback loop, it may take the form of either an actual measured torque or a calculated torque (as illustrated in FIG. 6).

In the foregoing description, the use of filtered feedback of frequency components of the firing sequence that are of concern to help provide vibration/noise suppression has primarily been described in the context of specific implementations of the skip fire drive pulse generator (e.g., using $1^{st}$ and $3^{rd}$ order sigma delta based converters). However, it should be appreciated that the described vibration/noise suppression approach can be used effectively with a wide variety of skip fire controllers, including sigma-delta based drive pulse generators of any order or type and drive pulse generators based on a variety of other types of converters and controllers as well.

In most of the examples described above, torque is used in the primary feedback loop. However, it should be appreciated that this is not a requirement. Rather, a variety of different sources or combinations of sources may be used in the primary feedback loops. As mentioned above, in other embodiments, the primary feedback may be an indication of the working chamber firings or other suitable inputs such as wheel speed, engine speed, transmission speed, accelerometer readings, etc. In still other embodiments, feedback may be provided to the drive pulse generator from multiple sources including more than one of these foregoing sources. Such feedback may be scaled in a variety of manners to meet the needs of any particular application. In some implementations, such feedback may be measured, while in others it may be the result of calculations or it may be read from appropriate look-up tables.

Figure 7:
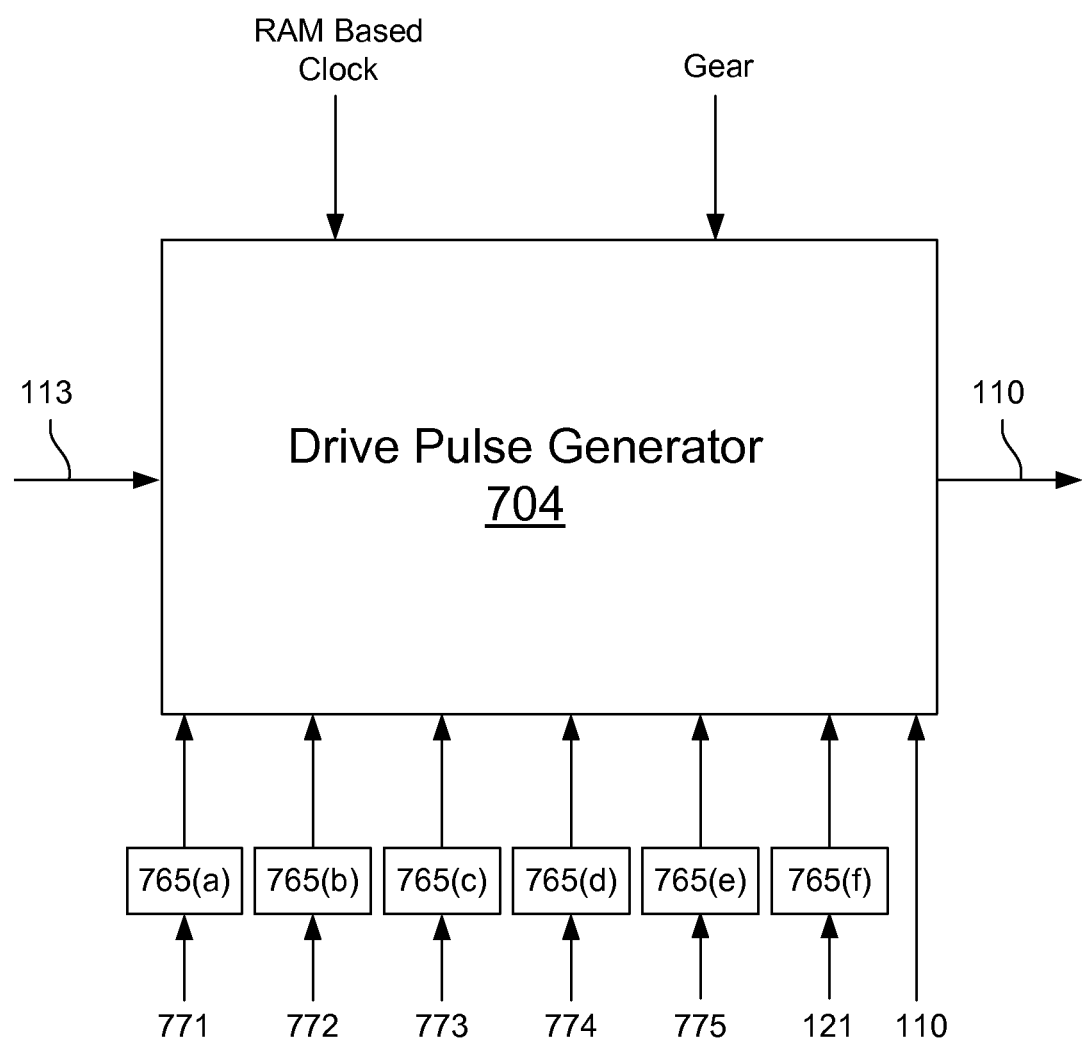
FIG. 7 illustrates yet another alternative drive pulse generator embodiment that utilizes multiple different feedback sources in the determination of the firing pattern.

An example of another type of a controller that uses multiple different types of feedback will be described with reference to FIG. 7. In this embodiment several types of feedback are provided to the drive pulse generator 704 and are available for use as part of the primary feedback loop. The types of feedback include the wheel speed signal 771 that is indicative of the speed of the vehicle's wheels, differential wheel speed signal 772 which is indicative of the acceleration of the wheels, drive pulse signal 110, engine speed signal 773 that is indicative of the rotational speed of the engine (e.g., the crankshaft), differential engine speed signal 774 which is indicative of changes in the rotational speed (i.e. angular acceleration) of the engine, vehicle acceleration signal 775 and estimated or actual torque signal 121. The drive pulse generator may be arranged to use some or all of the described signals in the primary feedback loop with the gains for each signal being scaled appropriately to provide the desired control.

By way of example, the drive pulse generator can be configured in a manner similar to the embodiments described above with respect to FIGS. 3, 5 and 6 except that in addition to, or in place of the torque signal 319, each of these signals may be used as feedback within the drive pulse generator 704 using appropriate gains in the same manner that the torque signal was fed back in these embodiments. The respective signals may then be combined by adders (e.g. adders 341, 343, 345, 445) as appropriate within the drive pulse generator. In embodiments that utilize second or higher order converters/controllers, the gains for some of the integrator inputs may be zero. In addition to suppressing vibrations (noise) generated by the choice of firing sequences, such feedback signals are also useful in suppressing vibrations that may arise from other sources. For example, if an accelerometer is used as a feedback source, it may sense road vibrations, which may then be suppressed by the control system.

When characteristics such as vehicle, wheel or engine speeds or accelerations are used in the feedback loops, it will typically be desirable to pass such signals through appropriate low pass filters 765(*a*)-765(*f*) before they are applied as feedback within the drive pulse generator. The low pass filters help insure that the signals that are fed back are within the drive pulse generator's bandwidth. Of course it may be desirable to utilize other types of filters in addition to or in place of the low pass filters.

As suggested with respect to the earlier embodiments, in some implementations it will be desirable to implement the low pass filters 765(*a*)-765(*f*) as variable filters that vary as a function of engine speed or some other engine characteristic. Additionally, in some implementations it may be desirable to vary the gain that is applied to each feedback signal 771, 772, 773, 774, 110, 121, as a function of a characteristic of the vehicle such as transmission gear ratio or some other engine variable. Similarly, it may be desirable to vary the transfer functions utilized within the integrators or other components within the drive pulse generator 704 as a function of the transmission gear or other appropriate variable. Like the previously described embodiments, a variable clock may be used to synchronize the output of the drive pulse generator 704 with the engine. Although some specific drive pulse generator designs have been described, it should be appreciated that the actual design of the drive pulse generator may be widely varied and is not limited to sigma-delta based converters illustrated in the exemplary figures.

Other Features

Although only a few embodiments of the invention have been described in detail, it should be appreciated that the invention may be implemented in many other forms without departing from the spirit or scope of the invention. The invention has been described primarily in the context of controlling the firing of 4-stroke piston engines suitable for use in motor vehicles. However, it should be appreciated that the described continuously variable displacement approaches are very well suited for use in a wide variety of internal combustion engines. These include engines for virtually any type of vehicle—including cars, trucks, boats, aircraft, motorcycles, scooters, etc.; for non-vehicular applications such as generators, lawn mowers, leaf blowers, models, etc.; and virtually any other application that utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkins cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

Some of the examples in the incorporated patents and patent applications contemplate an optimized skip fire approach in which the fired working chambers are fired under substantially optimal conditions (thermodynamic or otherwise). For example, the mass air charge introduced to the working chambers for each of the cylinder firings may be set at the mass air charge that provides substantially the highest thermodynamic efficiency at the current operating state of the engine (e.g., engine speed, environmental conditions, etc.). The described control approach works very well when used in conjunction with optimized skip fire engine operation. However, that is by no means a requirement. Rather, the described control approach works very well regardless of the conditions that the working chambers are fired under.

As explained in some of the referenced patents and patent applications, the described firing control unit may be implemented within an engine control unit, as a separate firing control co-processor or in any other suitable manner. In many applications it will be desirable to provide skip fire control as an additional operational mode to conventional (i.e., all cylinder firing) engine operation. This allows the engine to be operated in a conventional mode when conditions are not well suited for skip fire operation. For example, conventional operation may be preferable in certain engine states such as engine startup, low engine speeds, etc.

In some of the embodiments, it is assumed that all of the cylinders would be available for use in the continuously variable displacement mode. However, that is not a requirement. If desired for a particular application, the firing control unit can readily be designed to always skip some designated cylinder(s) when the required displacement is below some designated threshold. In still other implementations, any of the described working cycle skipping approaches could be applied to traditional variable displacement engines while operating in a mode in which some of their cylinders have been shut down.

The described continuously variable displacement mode of operation can readily be used with a variety of other fuel economy and/or performance enhancement techniques—including lean burning techniques, fuel injection profiling techniques, turbocharging, supercharging, etc. It is believed that the fact that the conditions within the cylinders are relatively fixed in fired cylinders make it easier to implement enhancement techniques that are generally known, but not in widespread use (e.g., the use of fuel injection profiling with multiple staged injections in automotive engines). Additionally, it is believed that the controlled conditions within the cylinders may also enable a variety of other enhancements that are not practical in conventional engines.

Most of the drive pulse generator embodiments described in detail above utilize sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to represent the input signal, so long as the synchronizer component of the drive pulse generator is adjusted accordingly.

Some of the illustrated embodiments utilize third order converters (e.g., three sequential integrators 342, 344, 346 are used in the embodiment of FIG. 3.) As mentioned above, in various alternative embodiments, either higher or lower order converters may be used. In general, a potential advantage of using higher order converters (e.g., converters having 3 or more stages) is their potential to further suppress noise in the band of interest. However, a design tradeoff is that higher order converters tend to be more complex and require extra efforts to maintain loop stability. Such designs can also be more susceptible to noise that is added to the system due to the delays and mechanical effects that are inherent in the operation of an internal combustion engine. As suggested above, appropriate poles and zero's can readily be designed into higher order converters to help further lower the noise in any particular band of interest. An advantage of lower order converters is their simplicity and single order converters have been found to work well in many applications.

This application describes the use of noise shaping techniques to help suppress the generation of firing sequences that are more prone to generate undesirable vibrations within the vehicle. Such techniques can be used in a wide variety of skip fire controllers, including systems that do not use feedback of any operational parameters other than the noise shaping feedback in the determination of the firing pattern. Similarly, such techniques can be used in conjunction with skip fire controllers that use any of a wide variety of other feedback sources in conjunction with the generation of the firing sequence.

This application also describes the use of a variety of different feedback sources in the determination of the firing sequence including torque, wheel speed, engine speed, etc. Such techniques can readily be used independently of one another and/or independently of the described noise shaping feature and/or with other mechanism that are arranged to help prevent or suppress the use of undesirable firing sequences.

Most conventional variable displacement piston engines are arranged to deactivate unused cylinders by keeping the valves closed throughout the entire working cycle in an attempt to minimize the negative effects of pumping air through unused cylinders. The described embodiments work well in engines that have the ability to deactivate or shutting down skipped cylinders in a similar manner. Although this approach works well, the piston still reciprocates within the cylinder. The reciprocation of the piston within the cylinder introduces frictional losses and in practice some of the compressed gases within the cylinder will typically escape past the piston ring, thereby introducing some pumping losses as well. Frictional losses due to piston reciprocation are relatively high in piston engines and therefore, significant further improvements in overall fuel efficiency can theoretically be had by disengaging the pistons during skipped working cycles. Over the years, there have been several engine designs that have attempted to reduce frictional losses in variable displacement engines by disengaging the piston from reciprocating. The present inventors are unaware of any such designs that have achieved commercial success. However, it is suspected that the limited market for such engines has hindered their development in production engines. Since the fuel efficiency gains associated with piston disengagement that are potentially available to engines that incorporate the described skip fire and variable displacement control approaches are quite significant, it may well make the development of piston disengagement engines commercially viable.

In view of the foregoing, it should be apparent that the present embodiments should be considered illustrative and not restrictive and the invention is not to be limited to the details given herein, but may be modified within the scope of the appended claims.

What is claimed is:

1. A method of determining firings during operation of an engine in a skip fire operational mode, the method comprising:
   receiving an input signal indicative of a desired engine output;
   selectively determining working cycles to be fired and working cycles to be skipped, wherein the fired working cycles are arranged to deliver the desired engine output;
   providing a torque feedback signal indicative of a torque; and
   wherein the determination of the firings is based at least in part on the torque feedback signal.

2. A method as recited in claim 1 further comprising filtering the torque feedback signal using a low pass filter, wherein the determination of the firings is based at least in part on the filtered torque feedback signal.

3. A method as recited in claim 1 wherein the torque feedback signal is indicative of a torque output of the engine.

4. A method as recited in claim 3 wherein the torque feedback signal indicates the instantaneous torque of the engine and has a profile that varies over a period between sequential firing opportunities of the engine.

5. A method as recited in claim 4 wherein the torque profile includes periods of negative torque.

6. A method as recited in claim 1 wherein the torque feedback signal is obtained at least in part from a torque sensor that monitors engine torque or the torque of a component in a drive train associated with the engine.

7. A method as recited in claim 1 wherein the torque feedback signal is generated at least in part by a torque calculator.

8. A method as recited in claim 1 wherein the torque feedback signal is determined at least in part by reference to a look-up table.

9. A method as recited in claim 8 wherein a first index for the lookup table is based on a mass of air introduced to an associated working chamber.

10. A method as recited in claim 8 wherein the engine includes a plurality of working chambers and wherein for each firing, an index for the lookup table is based at least in part on a firing history of an associated working chamber.

11. A method as recited in claim 1 wherein the torque is selected from the group consisting of: a transmission torque, a drive shaft torque, a wheel torque, and a torque converter torque.

12. A method as recited in claim 1, wherein feedback from at least one additional source is used in the determination of the firing sequence, wherein the at least one additional source is selected from the group consisting of vehicle acceleration, wheel speed, wheel acceleration, engine speed, engine acceleration, and speed or acceleration of a component of a drive train between an engine and a vehicle's wheels.

13. A controller for determining working cycle firings of an engine during operation of the engine in a skip fire operational mode, the controller comprising a control block that receives an input signal indicative of a desired output and is arranged to dynamically determine working chamber firings that deliver the desired output, wherein the control block is arranged to receive a torque feedback signal that is indicative of a torque associated with the engine and to determine the firings based at least in part on the torque feedback signal.

14. A controller as recited in claim 13 wherein the torque is one selected from the group consisting of:
the torque output of the engine;
the torque of a drive shaft associated with the engine;
the torque of a torque converter associated with the engine;
the torque of a transmission associated with the engine; and
the torque of a wheel associated with the engine.

15. A controller as recited in claim 13 wherein the control block is arranged to dynamically determine the working chamber firings on a firing opportunity by firing opportunity basis.

16. A controller as recited in claim 13 wherein the torque feedback signal is indicative of the instantaneous torque output of the engine.

17. An engine comprising a plurality of working chambers and the controller recited in claim 16, wherein the engine further includes a torque sensor that generates the torque feedback signal.

18. A controller as recited in claim 13 further comprising a lookup table that includes entries indicative of the instantaneous torque provided by working chamber firings under a multiplicity of different operating conditions and the torque feedback signal is generated based at least in part by referencing the lookup table.

19. A controller as recited in claim 18 wherein a first index for the lookup table is based on a mass of air introduced into an associated working chamber.

20. A controller as recited in claim 18 wherein the engine includes a plurality of working chambers and wherein for each firing an index for the lookup table is based at least in part on a firing history of an associated working chamber.

21. A controller as recited in claim 13 further comprising a filter arranged to filter high frequency components from the torque feedback signal to help stabilize the controller.

22. A controller as recited in claim 13 further comprising a variable filter arranged to filter the torque feedback signal, wherein the variable filter has frequency characteristics that vary as a function of engine speed.

23. A controller as recited in claim 13 further comprising a filter arranged to filter the torque feedback signal, wherein the controller is arranged to vary the frequency characteristics of the filter as a function of a transmission gear ratio.

24. A controller as recited in claim 13 wherein the controller includes a sigma delta converter and the torque feedback signal is used directly or indirectly in the primary feedback loop of the sigma delta converter.

25. A method of determining firings during operation of an engine in a skip fire operational mode, the method comprising:
receiving an input signal indicative of a desired engine output;
selectively determining working cycles to be fired and working cycles to be skipped, wherein the fired working cycles are arranged to deliver the desired engine output;
providing a feedback signal selected from the group consisting of vehicle acceleration, wheel speed, wheel acceleration, speed of a component of a drive train and acceleration of a component of the drive train; and
wherein the determination of the firings is based at least in part on the feedback signal.

26. A method as recited in claim 25 further comprising filtering the feedback signal using a low pass filter, wherein the determination of the firings is based at least in part on the filtered feedback signal.

27. A method as recited in claim 25 wherein the feedback signal is indicative of an operational parameter and is obtained at least in part from one selected from the group consisting of:
a sensor that monitors the parameter indicated by the feedback signal;
a calculator arranged to calculate the parameter indicated by the feedback signal; and
a look-up table.

28. A method as recited in claim 25 further comprising a variable filter arranged to filter the feedback signal, wherein the variable filter has frequency characteristics that vary as a function of engine speed.

29. A method as recited in claim 25 further comprising a filter arranged to filter the feedback signal, wherein controller is arranged to vary the frequency characteristics of the filter as a function of a transmission gear ratio.

30. A method as recited in claim 25 wherein the controller includes a sigma delta converter and the feedback signal is used directly or indirectly in the primary feedback loop of the sigma delta converter.

31. A method as recited in claim 25, wherein feedback from at least one additional source is also used in the determination of the firing sequence, wherein the at least one additional source is selected from the group consisting of vehicle acceleration, wheel speed, wheel acceleration, engine speed, engine acceleration, engine torque, and speed, acceleration or torque of a component of a drive train between an engine and a vehicle's wheels.

32. A controller for determining firings during operation of an engine in a skip fire operational mode, wherein the controller includes:
- a converter that receives an input signal indicative of a desired output and is arranged to generate a digital converter output signal that is reflective of the input signal and oversampled relative to the firing opportunities of the engine; and
- a synchronizer that is synchronized with the firing opportunities of the engine, wherein the synchronizer decimates the digital converter output signal in a manner to produce a drive pulse signal that defines a firing sequence that delivers the desired output.

33. A controller as recited in claim 32 wherein the converter is a sigma delta converter.

34. A controller as recited in claim 33 wherein the converter is a first order sigma delta controller or a third order sigma delta converter.

35. A controller as recited in claim 32 wherein the converter includes at least one split pole arranged to compensate for delays introduced by the synchronizer.

\* \* \* \* \*